United States Patent
Brardjanian et al.

(10) Patent No.: US 6,567,480 B1
(45) Date of Patent: May 20, 2003

(54) METHOD AND APPARATUS FOR SAMPLING TIMING ADJUSTMENT AND FREQUENCY OFFSET COMPENSATION

(75) Inventors: Nima Brardjanian, Eatontown, NJ (US); Yong J. Lee, Holmdel, NJ (US); Alex Matusevich, Morris Plains, NJ (US); Mohsen Sarraf, Rumson, NJ (US); Sheng-Jen Tsai, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/371,529

(22) Filed: Aug. 10, 1999

(51) Int. Cl.$^7$ .......................... H04L 27/22; H04L 27/14; H04L 27/16; H03K 5/159; H04B 1/10
(52) U.S. Cl. ................. 375/331; 375/231; 375/233; 375/324; 375/329; 375/330; 375/350; 329/315
(58) Field of Search .................. 375/329, 267, 375/322, 231, 233, 324, 350, 330; 329/315

(56) References Cited

U.S. PATENT DOCUMENTS

| | | | | |
|---|---|---|---|---|
| 4,027,250 A | * | 5/1977 | Lang ........................... | 325/323 |
| 4,447,910 A | * | 5/1984 | Smith et al. .................. | 375/99 |
| 4,849,991 A | * | 7/1989 | Arnold et al. ................. | 375/84 |
| 4,941,155 A | * | 7/1990 | Chuang et al. ................ | 375/84 |
| 5,283,815 A | * | 2/1994 | Chennakeshu et al. ........ | 375/84 |
| 5,394,435 A | * | 2/1995 | Weerackody ................ | 375/206 |
| 5,465,271 A | * | 11/1995 | Hladik et al. ................ | 375/267 |
| 5,960,044 A | * | 9/1999 | Montreuil .................... | 375/322 |
| 6,055,281 A | * | 4/2000 | Hendrickson et al. ........ | 375/329 |

* cited by examiner

Primary Examiner—Stephen Chin
Assistant Examiner—Sam Ahn
(74) Attorney, Agent, or Firm—Troutman, Sanders, Mays & Valentine (57) ABSTRACT

A simplified method for sampling timing adjustment and frequency offset estimation in a TDMA cellular PCS environment using π/4 - shifted DQPSK comprises the steps of oversampling a received signal resulting from transmission of sequences of complex-valued symbols at a rate N times the symbol rate thereof so as to produce N sets of samples, comparing for each set of samples the differential phase angle between successively received complex-valued symbols, and determining which set of the N sets of samples has differential phase angles closest to ideal values to thereby obtain an optimal sampling timing. The differential phase angles are measured by multiplying a complex conjugate of a received complex-valued symbol and a succeeding symbol to produce a comparison vector having an angle equal to the differential phase angle between the received complex-valued symbol and the succeeding symbol. The differential phase angles are optionally rotated so that the angle thereof is between 0° and 90°. Frequency offset is estimated by determining a constant deviation of the differential phase angles from an ideal differential phase angle value for a plurality of successive comparison vectors by correlating the rotated comparison vectors against a bank of unit vectors to determine a maximum correlation.

13 Claims, 4 Drawing Sheets

METHOD AND APPARATUS FOR SAMPLING TIMING ADJUSTMENT AND FREQUENCY OFFSET COMPENSATION

BACKGROUND OF THE INVENTION

1. Field of the Invention

The present invention relates generally to a method and apparatus for communication, and more particularly, to a method for sample timing adjustment and frequency offset estimation and compensation, and to a radio system having sample timing adjustment means and frequency offset estimation and compensation means.

2. Description of the Related Art

The present invention relates generally to signal recovery in communication systems and is particularly applicable to, and is described below in the context of, a digital cellular communication system such as the North American TDMA (Time Division Multiple Access) cellular communication system compatible with EIA/TIA documents IS-54 (Revs. A and B) and IS-136.

A conventional wireless radio system used for telephony consists of three basic elements—namely, mobile units, cell sites, and a Mobile Switching Center ("MSC"). In a basic cellular system, a geographic service area, such as a city, is subdivided into a plurality of smaller radio coverage areas, or "cells". A mobile unit communicates by radio frequency (RF) signals to the cell site within its radio coverage area. The cell site's base station converts these radio signals for transfer to the MSC via wire (landline) or wireless (microwave) communication links. The MSC routes the call to another mobile unit in the system or the appropriate landline facility. These three elements are integrated to form a ubiquitous coverage radio system that can connect to the public switched telephone network (PSTN).

A mobile unit contains a radio transceiver, a user interface portion, and an antenna assembly, in one physical package. The radio transceiver converts audio to a radio frequency signal for transmission to a cell site and converts received RF signals into audio. The user interface portion includes the display and keypad which allow the subscriber to communicate commands to the transceiver. The antenna assembly couples RF energy between the electronics within the mobile unit and the "channel", which is the outside air, for transmission and reception. Each mobile unit has a Mobile Identification Number ("MIN") stored in an internal memory referred to as a Number Assignment Module (NAM).

A cell site links the mobile unit and the cellular system switching center, and contains a base station, transmission tower, and antenna assembly. The base station converts the radio signals to electrical signals for transfer to and from a switching center.

Digital cellular technology, in which information consisting of voice and data is digitally encoded onto an RF carrier signal, or systems which are compatible with digital and analog cellular communication standards are currently more popular than analog systems. Presently, there are three basic types of digital cellular technology; Time Division Multiple Access (TDMA), Frequency Division Multiple Access (FDMA) and Code Division Multiple Access (CDMA). Digital cellular systems currently fall within these three categories and many use a combination of one or more of these technologies along with analog techniques.

In order to satisfy a demand for a tenfold increase in system capacity over conventional analog cellular systems, the telephone industry group (TIA) of the Electronics Industry Association (EIA/TIA) promulgated an Interim Standard for time division multiplexed (TDM) wireless digital telephony in the late 1980's, known as IS-54. IS-54 (revs. A and B), and the more current Interim Standard for time division multiplexed wireless telephony, IS-136, use Time Division Multiple Access (TDMA) digital technology to effectively increase the limited bandwidth available for cellular communications. The EIA/TIA IS-54 (revs. A and B) and IS-136 standards are well known in the art and are incorporated herein by reference.

In a TDMA system under IS-54, for instance, data is communicated in symbol bursts arranged in time slots each comprising 162 symbols which include a sync (synchronization) word of 14 symbols followed by an information sequence. Communication from a cell site to mobile units is performed on a time division multiplexed basis whereby each cellular channel is used within each cell to facilitate simultaneous communication with 3 to 6 mobile units. Typically 3 to 6 users (data channels) share a common 30 kHz channel in TDMA operation. Each user transmits data in an assigned time slot that is part of a larger frame. The sync word is used to facilitate timing recovery, i.e., to determine an optimum time for sampling the received signal for further processing to recover the communicated information. It is well known that timing recovery and the necessary processing of the samples are made more difficult by a low signal-to-noise ratio (SNR) and that a low SNR can often be present in cellular communication systems.

In order to receive a transmitted digital signal, the communicating units must determine the beginning and end of signals intended for them, known as frame/slot synchronization. The complexity and accuracy of frame/slot synchronization depend upon the number of points at which the signal is sampled and the ability of the system to compensate for signal distortion. Increasing the number of samples per transmitted symbol results in an increase in the accuracy of the receiver at the expense of a higher complexity. Another crucial function required in TDMA communication is the need to determine the optimum time within a symbol interval to sample the signal and determine the relative phase angle of the symbol. Once the optimum point for symbol timing is determined, all the symbols within a burst can be demodulated using carrier recovery circuitry and the burst decoded and converted into an analog speech signal or other data.

Generally, a received signal is oversampled at N times the symbol rate, wherein N is an integer. Thus N sets of samples of a received signal are stored in a decision block, and various known techniques for determining the optimum set of samples may be applied to extract the information contained in the received signal.

Various methods for determining optimum sampling timing are known, and some such methods determine, on a burst-by-burst basis, the optimum sampling timing by selecting a set of samples which exhibit the best correlation with the previously-known sync word. After determination of an initial optimum sampling timing through timing recovery using the sync word, however, it is necessary to maintain an optimum sampling timing throughout the entire information sequence. This is typically referred to as timing tracking or sample timing adjustment, and serves to avoid cumulative errors of the sampling times during the information sequence, which, if not corrected, can detract from the recovery of the communicated information. Determination of an optimum sampling timing using the sync word does not compensate for signal distortion occurring in a portion of a signal burst separate from the sync word. There is thus a need for a sampling timing adjustment method which is capable of determining optimum sampling timing in a high-loss environment, such as a cellular communication channel, which is sufficiently rapid to effect frequent, high-speed sampling timing adjustments without knowledge of an information sequence in multiplexed or burst communications, such as TDMA cellular communications, and which has minimal processing overhead and hardware requirements.

In a TDMA cellular system, channel-induced signal distortion often appears as a phase shift induced between encoded symbols in a received signal. Since phase modulation of a carrier is used to encode information in TDMA cellular systems, unwanted phase-shifts in a modulated signal may render a signal undetectable. By itself, sampling timing adjustment may not adequately compensate for unwanted phase shift. In addition to determining an optimum sampling timing, therefore, techniques for reducing or eliminating unwanted phase shifts are required in a TDMA cellular system.

In time division multiplexed digital communication systems such as the North American TDMA cellular telephone system, information is typically transmitted as symbols encoded in the phase of the transmitted signal with respect to its carrier. In order to ensure proper extraction of the symbols using coherent detection, the local oscillator frequency used to demodulate the received signal must either be identical to the carrier frequency of the received signal or frequency compensation must be performed on the downconverted signal. Absent compensation for a frequency difference between the carrier of a modulated signal and the local oscillator used to extract the modulated information, the apparent phase relationship "rotates" undesirably. Typical methods for the elimination of phase rotation include matching the local oscillator and carrier frequencies, adjusting the frequency of the downconverted signal by an appropriate value, and reconstructing a clock signal used for sampling a downconverted signal based upon the frequency of the carrier.

As is well known in the art, many communication systems, including TDMA cellular systems, rely upon the use of synchronous or so-called "quasi-synchronous" detection to extract encoded voice or data contained in a received information signal. In a synchronous detector, the received signal is typically mixed (i.e., multiplied) with a "local oscillator" signal having a frequency that is matched to the carrier frequency of the received signal. The local oscillator frequency is "locked" to the carrier frequency of the received signal to eliminate frequency offset therebetween. In quasi-synchronous detection, a detector that is not locked to the carrier frequency of the received signal is used. Frequency offset is corrected by adjustment of the frequency of the downconverted intermediate frequency (IF) or baseband signal by a frequency offset multiplier having a value based upon a detected or estimated frequency offset.

In certain transmission protocols, the effect of phase rotation is somewhat reduced. In differential quadrature phase-shift keying ("DQPSK"), for instance, the encoded information is contained in the difference in phase between a given symbol and the previous symbol, rather than in the absolute phase of the modulated symbol. In an ideal channel, a frequency offset between the local oscillator of the receiver and the carrier frequency of the transmitted signal does not present a significant problem in a system employing DQPSK as long as the symbol frequency is much larger than the frequency offset.

The cellular channel is not ideal, however, and is subject to various types of distortion such as delay spread due to multipath fading, the Doppler effect, flat and frequency-selective fading, additive noise, and the like Thus, a process such as adaptive equalization, which involves the adaptive characterization of channel distortion, is needed in order to extract symbols accurately from the time-dispersive channel. To estimate and compensate for channel-induced distortion, cellular systems typically utilize adaptive equalization techniques which predict the channel response based upon the transmission of known data (e.g., a so-called training sequence) However, such processes are themselves sensitive to significant distortion, including frequency offsets, which may cause the channel to vary beyond the rate at which the adaptive processes can adapt. Even for DQPSK systems, therefore, accurate sample timing adjustment and frequency offset compensation is necessary.

Many conventional sampling timing adjustment and frequency offset estimation methods utilize the sync word or other known information sequence to effect compensation for signal distortion. In a time-dispersive channel, however, it would be desirable to perform sampling timing adjustment and frequency offset correction to compensate for signal distortion occurring in a portion of a signal burst separate from a sync word or other predetermined information sequence. Such errors may result in an increased bit error rate when optimum sampling timing and frequency offset estimation is determined based solely upon the known information sequence.

Accordingly, there is a need for a sufficiently rapid and simplified method and apparatus for sampling timing adjustment and frequency offset estimation which may be used with known or unknown data and does not require prior knowledge of an encoded information sequence, and which minimizes processing time and optimally avoids the need for costly additional circuitry.

While current methods used for the reduction or elimination of phase shift due to channel-induced distortion have the tendency to increase decoding accuracy and reduce the need for repeated sampling timing adjustment, conventional phase correction techniques may not meet the demand for the reduced size and cost requirements of a particular system. Thus, a simplified correction technique for enhancing, supplementing or replacing known frequency tracking and sampling timing adjustment means is needed.

For instance, a conventional technique used for phase tracking employs a phase-locked-loop ("PLL"). A PLL circuit is typically formed as a phase detector fed by input and feedback signals, a loop filter and a voltage controlled oscillator for producing a sine wave (i.e., the feedback signal). The phase of the received signal, or a frequency-translated version thereof (e.g., an intermediate frequency (IF) signal), is compared with the local phase reference (i.e., the local oscillator), and the average phase difference over time is used to adjust the frequency of the reference. Unfortunately, PLL systems tend to require a fair amount of time to achieve phase lock, and the result in a cellular telephone system can be unacceptable. In addition, in cellular systems based on burst data transfer, control data is often contained in a single packet, which may be lost before phase lock is achieved. An objectionable amount of dead time may also be encountered during handoff from one cell to another. This is true both for conventional, analog PLLs and for digital equivalents. Moreover, in wireless communications, the design of automatic frequency control (AFC) circuitry, such as PLLS, has been constrained by circuit complexity, and system designs have typically made frequency accuracy constraints somewhat loose to avoid prohibitive costs in complexity or processing requirements. There is thus a need for sampling timing adjustment and frequency offset compensation methods which are capable of enhancing, supplementing or replacing PLL circuits which are not capable of achieving adequate phase lock in a given communication system.

In addition, with the introduction of more optimal modulation schemes such as QPSK, relatively precise frequency estimates are often needed. Frequency errors may arise, for example, from the transmitter/receiver clock not being perfectly locked due to inaccuracies or drift in the crystal oscillator, as well as from large frequency shifts due to the Doppler effect, such as those occurring from vehicles moving at high speeds in open spaces. Many cellular systems allow only a small amount of time for achieving initial signal acquisition and require a minimum tracking error after initial acquisition. However, typical AFC or PLL circuits are not generally able to lock on or track the received signal with a reasonable degree of accuracy.

The extraction of encoded information from a signal transmitted over a time-varying cellular channel thus requires a plurality of processes for attaining accurate frame/slot synchronization, optimum sampling timing adjustment, and frequency offset estimation. It would be desirable to minimize the structure and processing required to perform these processes.

In application Ser. No. 09/371529, assigned to the assignee herein, and entitled "Method and Apparatus for Frequency Offset Compensation", applicants disclose a technique for frequency offset estimation and compensation which relies on differential phase information extracted from the modulated signal in order to estimate the frequency offset. This process monitors and corrects for deviations from ideal values in the differential phase angle between successively received symbol samples in a DQPSK-modulated waveform, Since frequency offset results in a fairly constant phase offset in a received waveform over an entire burst of symbols, detection of a constant deviation in phase angle over a predetermined number of symbols provides a sufficiently accurate estimate of frequency offset. Determination of non-constant deviations from ideal conditions is also possible, thus providing a system which is capable of achieving a desired bit error rate.

The need to perform various signal enhancement techniques such as sampling timing adjustment and frequency offset correction to reduce the bit error rate in a communication system increases the hardware requirements and processing throughput of such a system. There is thus a need for a technique which reduces the hardware and processing requirements required to perform these processes.

SUMMARY OF THE INVENTION

The present invention is based upon the recognition that certain modulation techniques exhibit statistical characteristics that are detectable even in the presence of severe channel-induced distortion. The time and processing requirements needed to perform sampling timing adjustment can be substantially reduced by determining an optimum sampling timing based upon a minimum deviation from expected differential phase angles between successive pairs of received symbols in an ideal channel. By detecting an offset from expected differential phase angles ideal conditions, i.e., phase rotation, frequency offset can also be estimated based upon the same differential phase values calculated for sampling timing adjustment purposes, thereby reducing the necessary hardware and processing requirements for performing sampling timing adjustment and frequency offset estimation.

In $\pi/4$-shifted DQPSK, the possible differential phase angles between two consecutive received symbols over an ideal channel are $\pm 45°$ or $\pm 135°$. Channel effects produce results which deviate from ideal conditions. However, even in the presence of severe channel distortion there is a statistical concentration of differential phase angle values in the vicinity of $\pm 45°$ or $\pm 135°$. By determining which of a plurality of sets of samples of an oversampled signal has differential phase angles between successive symbols which are closest to the ideal values, the optimal sampling timing can be determined.

In accordance with one aspect of the present invention, sampling timing adjustment is performed in a TDMA cellular system by oversampling a received signal to produce a plurality of sets of samples of the signal, determining for each set of samples the differential phase angle between successive symbols by multiplying pairs of successively received symbols to produce a vector having an angle representing the phase angle therebetween, and determining which set of samples has differential phase angles closest to the expected values under ideal conditions.

In order to correct for frequency offset, a deviation in differential phase angle is detected from a selected set of samples. As noted above, the expected differential phase angle between successive samples in $\pi/4$-shifted DQPSK, in an ideal channel, is either $\pm 45°$ or $\pm 135°$. A deviation from the expected phase angles is observed, and this deviation is indicative of "phase rotation" due to frequency offset between the local reference and the carrier. This phase rotation can then be used to adjust the local oscillator frequency. Since this approach eliminates the need to average over long periods, the filtering out of data-dependent effects, and the use of known data sequences, the time required to achieve adequate frequency-offset compensation is shorter in many important environments than it is for conventional systems.

By conducting similar processing for sampling timing adjustment and frequency offset estimation, including the determination of differential phase angles for successive received symbols, shared processing can be performed thereby reducing the hardware and processing requirements needed for sampling timing adjustment and frequency offset estimation.

BRIEF DESCRIPTION OF THE DRAWINGS

These and further features and advantages of the present invention are described below in connection with the accompanying drawings, in which.

DETAILED DESCRIPTION OF THE PREFERRED EMBODIMENTS

As the demand for an increased capacity in wireless communication systems has grown, the telecommunications industry has responded by developing different approaches to effectively extend the limited radio frequency (RF) spectrum allocated to cellular systems. Approaches taken to satisfy the demand for greater capacity include the use of time, frequency and code division multiplexed digital communications. In such digital wireless communications systems, bandwidth-efficient modulation techniques are used to maximize the amount of information transmitted in the form of digital voice and data channels.

These systems accomplish the need for increased capacity 10 by reducing the spectral bandwidth required for the transmission of each assigned channel in the radio frequency spectrum. In TDMA, bandwidth is increased by transmitting data in bursts which are multiplexed for a plurality of users so that typically 3 to 6 users can share a single channel. The use of multiplexed bursts introduces somewhat unique difficulties in problems in that correction for signal distortion must be performed within each burst of information in a limited period of time.

Although the present invention is described hereinafter as improvements in sampling timing adjustment and frequency offset estimation for a TDMA cellular communication system, it will be readily appreciated by those skilled in the art that the present invention is not limited to TDMA. Other types of communication systems (e.g., analog, CDMA, FDMA, GSM, trunked or other landline systems, satellite communication systems, data networks, and the like) and other types of modulation techniques may also be adapted and/or designed to use the principles described herein. The description of the present invention as an improvement for TDMA cellular communication is not intended to impart any limitations on the application of the principles described herein to any particular type of communication scheme. In particular, the sampling timing adjustment and frequency offset estimation techniques of the present invention may be used in connection with any type of communication system using a modulation technique in which a deviation from an ideal values is detectable without the need for a priori knowledge of a received information sequence.

Figure 1:
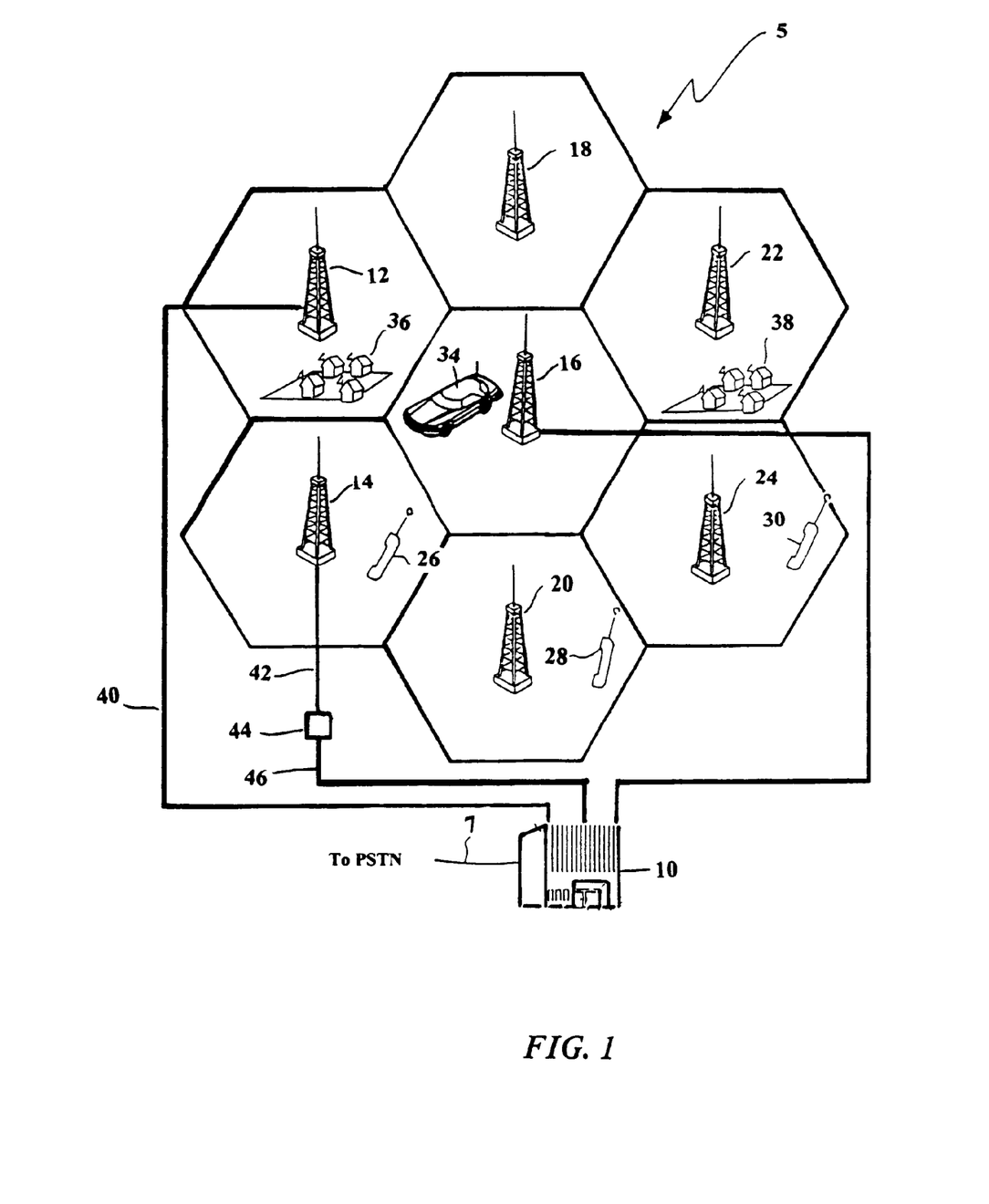
FIG. 1 is a diagram of a cellular communication system in which the present invention may be implemented.

Referring to FIG. 1, a diagram of a conventional TDMA digital telephony system 5 in which the present invention may be practiced is shown. The system 5 includes a number of fixed base units 12, 14, 16, 18, 20, 22 and 24 and a number of mobile transceivers 26, 28, 30, 32, 34, as well as mobile units located in buildings 36 and 38. By use of time division multiple access, each mobile transceiver can access a fixed base unit through a separately assigned channel to carry duplex communication on a time division multiplexed (TDM) basis. In a conventional TDMA system such as that illustrated in FIG. 1, the average power utilized by the mobile transceivers is on the order of 5 to 10 milliwatts or less to provide a range of several hundred to a thousand feet between a base station and its mobile transceivers. To accommodate a relatively large service area, several base stations are used with individual calls being successively handed off from base station to base station as their corresponding callers carry their mobile units from the service area (i.e., cell) associated with one base station to that of an adjacent base station. An appropriate switch (not shown) which is located within a local central end office is suitably programmed to operate in a similar manner as does a mobile telephone switching office in order to controllably handoff calls from one base station to another as the callers transit corresponding local service areas associated therewith.

The base stations are connected to the switch located within the central office 10 to provide access to the public switched telephone network. This connection can typically occur in one of two ways, either through copper digital lines 40, 42 as in base stations 12 and 16, or via intermediary copper digital line 42 to remote electronics 44 as in the case of base station 14. The remote electronics 44 contain fixed distribution and concentration facilities for multiplexing traffic, in addition to that provided by the base station 14, onto fiber feeder 46 which, in turn, feeds central office 10. The switch located within the central office is connected, through a trunk 7, to the public switched telephone network.

In the TDMA system illustrated in FIG. 1, each base station transmits time division multiplexed bit streams on a predefined carrier frequency using $\pi/4$-shifted DQPSK modulation, with an inter-carrier spacing of 150–300 kHz and within a given operating frequency band.

Each base station continuously transmits on a time division basis and the mobile transceivers transmit in bursts to their associated base station. Two different carrier frequencies are used to carry communication between each base station and a mobile transceiver; for instance, one frequency f1 is used by base station 12 to carry communication from that base station to each of its mobile transceivers, and another frequency f2 is used by base station 12 to carry communication from each of the mobile transceivers to this base station. Although adjacent base stations use different pairs of frequencies, these carrier frequencies are also reused for base stations that are spaced sufficiently far apart from each other to conserve spectrum. The spacing is appropriately set to ensure that co-channel interference that might occur at any port will remain at an acceptably low level.

Figure 2:
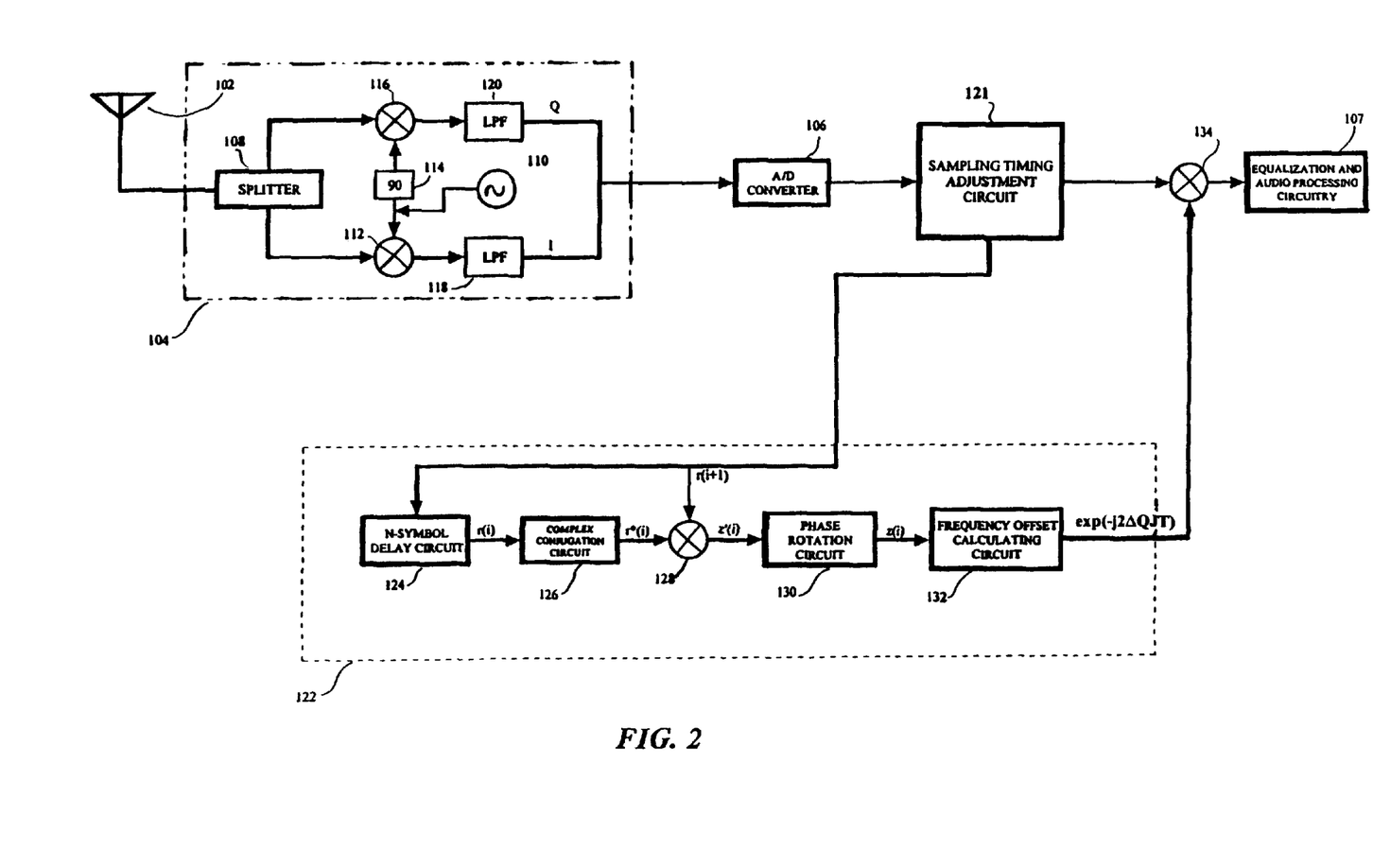
FIG. 2 is a block diagram of a receiver in accordance with a first preferred embodiment of the present invention.

FIG. 2 is a block diagram of a digital demodulator 100 incorporating sampling timing adjustment and frequency offset compensation means according to the present invention. The demodulator 100 is preferably incorporated in both the base stations and the mobile transceivers in a TDMA portable radio communications system. As noted above, both the base stations and the mobile units transmit symbol bursts, the base stations using TDM for transmission of symbol bursts to either three or six users. For purposes of discussion, it will be assumed that the demodulator 100 shown in FIG. 2 represents a demodulator in a mobile transceiver unit.

An antenna 102 receives each radio transmitted burst having a carrier frequency in the range of 0.5 to 5 GHz. An analog receiver 104 amplifies, filters and downconverts the RF signal to a baseband signal. A complex sampler 106 samples the IF signal by sampling at four times the symbol rate (or any other desired multiple thereof), The resultant output consists of in-phase (I) and quadrature phase (Q) signals for each symbol, thus resulting a four distinct sets of samples for an information sequence. A ROM may be used in subsequent stages of the demodulator as a look-up table of arctangents to determine the phase of each sample from the I and Q signals. Subsequent circuitry, including equalization and audio processing circuitry 107, processes the signals to reproduce transmitted voice and information data.

The analog receiver 104 is a DQPSK receiver in which the input signal from an antenna 102 is applied to a power splitter 108 directly, as shown, or after translation to an intermediate frequency. A local oscillator 110 applies its output directly to a first mixer 112 and through a 90° phase shifter 114 to a second mixer 116. Low pass filters 118 and 120 pass only the difference frequencies in the resultant outputs of the mixers 112, 116 and thereby produce baseband signals representing the in-phase (I) and quadrature phase (Q) components, respectively, of the received signal.

The complex-valued output of the combination of the baseband I and Q components is applied to the complex value sampler 106 which, in practice, is generally a pair of Analog-to-Digital (A/D) converters which are symbolically illustrated in FIG. 2 as a single sampler (A/D converter) 106. The output of the sampler 106 is supplied to a sampling timing adjustment circuit 121 which operates in accordance with the principles discussed below. In practice, the sampling timing adjustment circuit 121 is preferably implemented in whole or part by a digital signal processor (DSP) or microprocessor and associated control program and storage device according to the principles described herein. In the presently described embodiment, the sampling timing adjustment circuit 121 is used to select an optimum sampling timing from the four individual sets of samples of received data output by the A/D converter 106. As will be appreciated by those of ordinary skill in the art, additional means may be used for determining an initial optimum sampling timing based upon a known data sequence, such as a sync word in a TDMA system, in which case the sampling timing adjustment circuit 121 may be used to periodically adjust the initial sampling timing determined by such additional means. Alternatively, the sampling timing adjustment circuit 121 may be used to obtain an initial optimum sampling timing based a known (or unknown) information sequence, and to adjust the sampling timing at selected intervals during a communication session. Any known method for obtaining an initial optimum sampling timing may be used in accordance with the present invention.

A first output of the sampling timing adjustment circuit 121 is supplied to a frequency offset estimation and compensation circuit 122 which may be any known circuit for estimating frequency offset.

Figure 3:
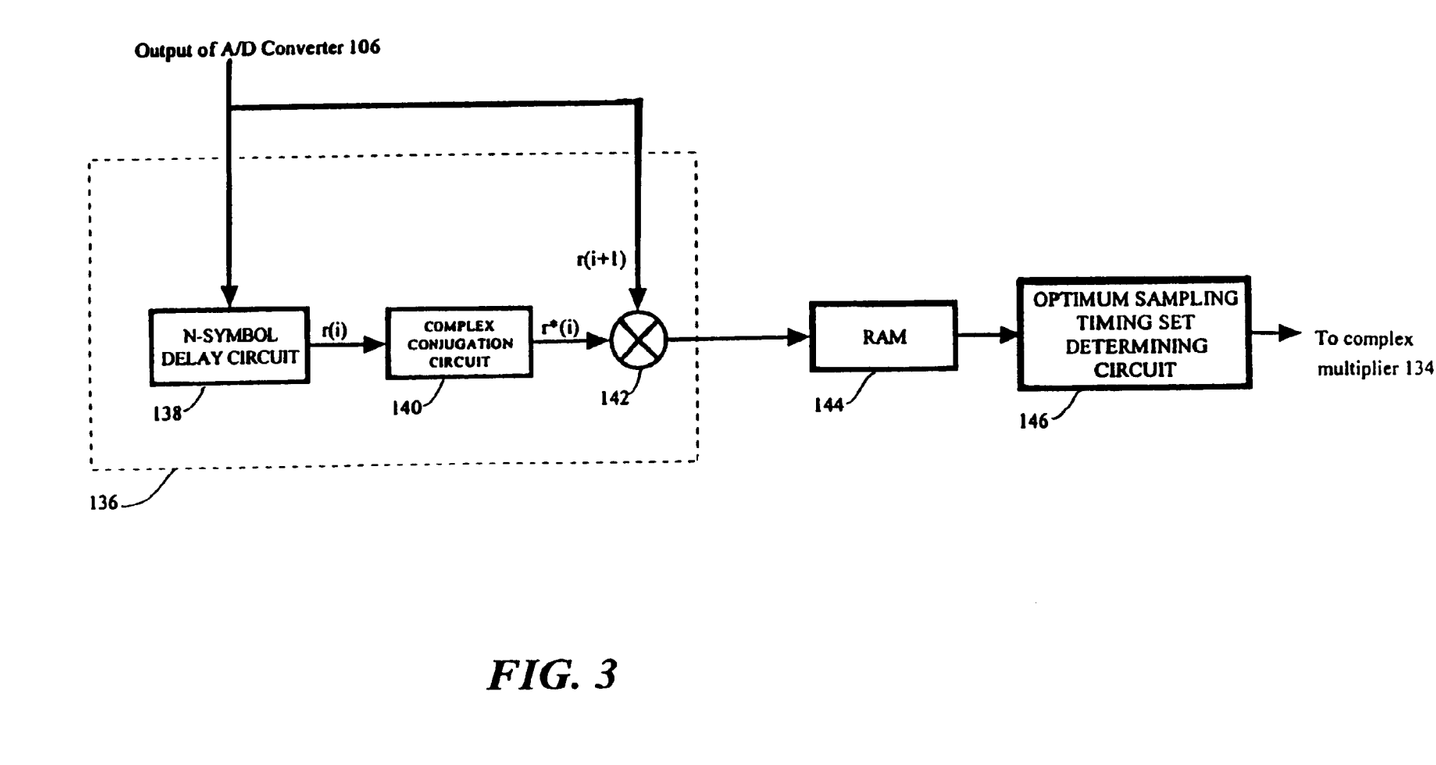
FIG. 3 is a block diagram of a sampling timing adjustment circuit in accordance with a preferred embodiment of the present invention.

The structure of the sampling timing adjustment circuit 121 will now be described with reference to FIG. 3, which is a block diagram of the sampling timing adjustment circuit 121 of FIG. 2. The output r(i) of the sampler 106, which comprises samples of the oversampled received signal, is supplied to a differential phase calculating circuit 136. The differential phase calculating circuit 136 includes an N-symbol delay circuit 138 for delaying by N symbols the sample r(i) input thereto. In the presently described embodiment, N is equal to 1. A complex conjugation circuit 140 determines the complex conjugate of r(i) (i.e., r*(i)), A complex multiplier 142 multiplies the complex conjugate r*(i) of the delayed sample r (i) by the immediately succeeding sample r(i+1) output from the sampler 106. The output of the complex multiplier 142, z(i), represents the differential phase angle between the succeeding symbols r(i) and r(i+1), which, in the case of π/4-shifted DQPSK, is either ±45°0 or ±135° in an ideal channel.

A plurality of pairs of successively received symbols r(i) and r(i+1) are processed in the foregoing manner. Thus, a separate set of differential phase angle values are produced for each set of pairs of symbols at each sampling period. The differential phase angle values of each set of samples of the oversampled burst are stored in a RAM 144.

Preferably, each set of samples is simultaneously processed by the sampling timing adjustment circuit 121 of the present invention. In particular, the present invention processes each burst (or any desired plurality of samples) to select the particular sampling timing, among the four samples per symbol stored in the RAM 144, that is most likely to be closest to an optimum sampling instant which has the smallest timing error. The optimum sampling timing set determining circuit 146 compares differential phase values for each of the sets of samples obtained at each of the four sampling times with ideal values over the entire burst to select the optimum sampling timing By performing sampling timing adjustment based upon a comparison between detected and ideal differential phase angles, the present invention effectively compensates for phase error between successively received symbols in a detected signal. As described above, in π/4-shifted DQPSK, the possible angle differences between two consecutively received symbols over an ideal channel are ±45° and ±135°. While actual results deviate from ideal conditions due to various factors, there is a statistical concentration of differential phase angle values in the vicinity of ±45° or ±135° even in the presence of severe channel-induced distortion. Thus, optimum sampling timing can be obtained by determining which of the four sets of differential phase angles stored in the RAM 144 has values closest to these expected angles.

According to the present invention, for each set of four samples, successive symbols in the received burst are processed to determine the phase difference therebetween in the manner described above. The sampling timing adjustment circuit 121 periodically processes a plurality of successively received symbols to determine optimum sampling timing based upon the phase difference between successive samples in each set of four samples.

In accordance with the present invention, sampling timing adjustment is accomplished by monitoring for and eliminating phase shift due to signal distortion observed in a received signal. In order to determine the sampling timing which yields the smallest bit error rate in decoded information, each set of samples in a signal burst (or any desired number of symbols) is separately processed so that the differential angle between successively received symbols is determined by multiplying symbol by the complex conjugate of the other. The resultant vector represents the differential phase angle between the symbols and thus represents the phase shift between the successive symbols due to the π/4-shifted DQPSK (i.e., a ±45° or ±135° phase shift). The resultant values are accumulated for each sampling instant (i.e., an entire burst or any portion thereof) and the sets of differential phase angles for each sampling timing are compared to determine as the optimum sampling timing the set having the greatest tightness of clusters about the expected angles. By selecting the set of samples having the smallest deviation from the ideal differential phase angles, phase shift due to signal distortion can be minimized or eliminated.

In order to conduct sampling timing adjustment by determining an updated optimum sampling timing according to the present invention, therefore, selected pairs of successive received symbols in a communication system are multiplied so that the resultant vector has an angle representing the phase shift between the successive symbols due to the π/4-shifted DQPSK (i.e., a ±45° or ±135° phase shift). The resultant values may optionally be rotated so that the in-phase (I) and quadrature phase (Q) components are positive and the angle of the vector is in the first quadrant. As a result of the rotation, the angle of the rotated values, in an ideal channel, should be 45°. As will be appreciated by those in the art, any angle may be used for comparison purposes. Deviation from 45° (or another predetermined angle), in the case of rotation, or deviation from the expected angles of ±45° or ±135°, where rotation of differential phase angles is not performed, is indicative of phase shift due to channel-induced distortion and other effects. By determining which of the four sets of samples exhibits differential phase angles closest to ideal results, the sampling timing can be optimized based upon the occurrence of phase shifts occurring in an information burst due to the time-varying channel. The precise number of samples per symbol that are taken by complex sampler 106, which is four in the presently described embodiment, may be set to any desired value. As will be appreciated by those in the art, the accuracy of the sampling timing adjustment performed by the present invention depends upon the number of samples. In particularly noisy environments, therefore, the number of samples may be increased. In some embodiments, the number of samples per symbol can be a variable based upon the level of detected noise.

In the present embodiment, the sampling timing adjustment circuit 121 operates without use of known data such as a pilot signal, training sequence or sync word. However, the present invention may also be practiced using such known data. In the preferred embodiment, however, optimum sampling timing is determined without advance knowledge of a symbol sequence, and sampling timing is determined based on the analysis of successive symbols in a received signal. In some preferred embodiments, the sampling timing adjustment circuit 121 can be used to obtain an initial sampling timing, which can be periodically updated to adjust the sampling timing due to channel effects. Alternatively, frame/slot synchronization and initial optimum sampling timing determination can be performed by other means, with or without the use of a known data sequence, and the sampling timing adjustment method and apparatus of the present invention can be applied at desired intervals to adjust the sampling timing to compensate for signal distortion.

In order to determine the optimal sampling timing among the four sets of samples stored in the RAM 144, the deviation of the values of $z(i)$ from the ideal phase angles noted above is determined by the optimum sampling timing set determining circuit 146.

In the present embodiment, there are four samples per symbol so that there are 4 streams of values of $z(i)$, i.e., $z0$, $z1$, $z2$ and $z3$, for each symbol. In a generalized system, there will be m sets of values of $z(i)$ for each symbol and each set of values of $z(i)$ may thus be represented as $z(i)=\{(z(j), z(j+m)\ z(j+2m), \ldots, z(i+(N-1)m)\}$. Each $z(i)$ value has N elements, wherein the value of N equals the number of symbols used to make a sampling timing adjustment. By determining the set of differential phase angles $z(i)$ which has the smallest deviation from ideal results, the optimum sampling timing is determined.

The accumulated values of $z(i)$ for each set of samples is used to determine the Bet of samples having the smallest deviation from ideal results. Various methods may be used to determine the optimal set of signal samples, and all such methods are within the scope of the present invention. In some preferred embodiments, the set of samples having the smallest deviation from ideal values is determined by rotating the differential angles so that the angle thereof falls in the first quadrant (which, under ideal conditions, should be 45°). This may be accomplished by rotating the value of $z(i)$ by either ±90° or 180° or by adding or subtracting enough multiples of 45° until the angle is closest to 45°. Then, a statistical process, such as variance, is applied to determine the tightness of each set of samples to 45°.

Additional methods for determining the optimum sampling timing, which are less cumbersome then use of such a statistical method, are described below. For instance, the sine or cosine of each of the differential phase angles from each stream of $z(i)$ may be compared to the sine or cosine of 45° and the optimum set of samples selected as the set having the smallest deviation therefrom. This method, however, suffers from ambiguity since two possible phase angle candidates exist for most sine or cosine values.

Another method of determining the concentration of phase angles around ideal results is to correlate the differential phase angles with a set of predetermined angles. The number of predetermined angles in the set may be increased to produce a more accurate result. After correlating the differential phase angles with the predetermined set of phase angles, a statistical method could be applied to determine the set of, samples representing the optimum sampling timing.

After the optimum sampling timing is determined, the set of samples reflecting the optimum sampling timing is output to the frequency offset estimation and compensation circuit 122.

As noted above, the frequency offset estimator circuit 122 is the same as that disclosed in applicants' co-pending application Ser. No. 09/353009. As described in applicants' co-pending application, frequency offset estimation is performed by determining the differential phase angle between selected pairs of successive symbols. The resultant values are rotated so that the in-phase (I) and quadrature phase (Q) components are positive and the angle of the vector is in the first quadrant. As a result of rotation, the angle of the rotated vectors, in an ideal channel, should be 45°. A deviation from 45° is indicative of "phase rotation" due to frequency offset between the local reference and the carrier. Once determined, the phase rotation value can be used to adjust the local reference or the symbol sequence and thereby eliminate the frequency offset.

The frequency offset estimator circuit 122 operates in a preferred embodiment without use of known data such as a pilot signal, training sequence or sync word. However, the present invention may also be practiced using such known data. In the preferred embodiment, frequency offset is estimated without a priori knowledge of a symbol sequence, and frequency offset is estimated and eliminated based on the analysis of successive symbols in a received signal.

The frequency offset estimator circuit 122 includes an N-symbol delay circuit 124 which receives the symbols of the selected set of samples from the sampling timing adjustment circuit 121 and outputs a symbol delayed by N symbol periods, wherein N is an integer representing a respective received symbol, In the presently described embodiment, N is equal to 1. Accordingly, the N-symbol delay circuit 124 outputs a symbol delayed by one symbol period. Assuming that a current symbol is represented by $r(i+1)$, wherein i is an integer representing a symbol period, the output of the N-symbol delay circuit 124 in the preferred embodiment is $r(i)$.

The output of the N-symbol delay circuit 124 is supplied to a complex conjugation circuit 126, which outputs the complex conjugate of $r(i)$ (i.e., $r^*(i)$).

A complex multiplier 128 receives an output of the analog-to-digital converter 106 and an output of the complex conjugation circuit 128 and multiplies the value of a current sample $r(i+1)$ with the value of the complex conjugate of the immediately preceding sample $r^*(i)$. By this multiplication, a vector having an angle representing the differential phase angle between the successive symbol samples $r(i)$ and $r(i+1)$ is produced.

Assuming that $r(i)$ represents the ith symbol of a received signal $R(t)$ and that $r^*(i)$ represents the complex conjugate of the ith symbol, the output $z'(i)$ of the complex multiplier 128 for the ith symbol is represented by $r(i)^*r(i+1)$. As noted above, in π/4-shifted DQPSK, the phase angle of all of the values of $z'(i)$ will be one of the four values ±45° or ±135° in an ideal channel.

In order to determine the phase rotation due to frequency offset, the phase angle of successive values of $z'(i)$ are compared to obtain a value of constant deviation from ideal conditions.

To simplify this comparison, a phase rotation circuit 130 modifies the values of z' (i) so that they each have positive I and Q components. This is done by rotating the value of z' (i) by either ±90° or 180°. Since the value of z' (i) will have an angle of ±45° or ±135° under ideal conditions, the value of z' (i) will be in the vicinity of these angles in a distorted channel so that if z' (i) has a value in the vicinity of −45°, rotation of z' (i) by +90° will result in a complex vector having an angle in the vicinity of 45°. Similarly, if z' (i) has an angle in the vicinity of +135°, rotation by −90° will result in a complex vector z(i) having an angle in the vicinity of 45°. If z' (i) is in the vicinity of −135°, rotation by 180° will result in a complex vector z (i) having an angle in the vicinity of 45°. The result of the phase rotation performed by the phase rotation circuit 130 is thus a vector z (i) having an angle which is 45° in an ideal channel.

Channel-induced distortion due to multipath fading and the like will cause deviation from the ideal angle of 45°. As noted above, however, frequency offset results in a constant phase rotation at a frequency of $2\pi\Delta\omega$, where $\Delta\omega$ is the differential phase error due to frequency offset. Detection of this phase rotation facilitates the elimination of frequency offset. The resultant constellation of expected phase values at the output of the phase rotation circuit 130 includes vectors which have expected differential phase values of ±45° and ±135° in the phase plane, but are offset by an angle $\Delta\omega T$, which represents the phase increment due to frequency offset in one symbol period (T). When viewed successively, the frequency offset results in a generally constant phase rotation at an angular velocity dependent upon the value of $\Delta\omega$. Removal of this phase rotation eliminates frequency offset between the local oscillator 110 and the detected signal R(t).

The above-described multiplication r*(i)r(i+1) and subsequent phase rotation results in a vector having an angle that, in an ideal channel, is 45°. In the presence of frequency offset and other channel distortion, the actual angle will deviate from 45° and will equal 45°+$\Delta\omega T$, wherein T is the symbol period. Determination of the value of $\Delta\omega T$ by the frequency offset estimator is described below.

In the presently preferred embodiment, a frequency offset calculating circuit 132 receives the output of the phase rotation circuit 130. A desired number of z(i) values are accumulated in, the frequency offset calculating circuit 132 and are used to detect a constant deviation from 45° (i.e., $\Delta\omega T$). As will be readily appreciated by those of ordinary skill in the art, the number of values of z(i) necessary to determine a constant deviation in ideal phase value will vary depending upon the application and may be varied depending upon the magnitude of deviation from 45° initially detected in the output of the phase rotation circuit 130. In communication systems employing packetized data transfer, phase error due to frequency offset will generally be expressed as a constant deviation from the ideal angle of 45°, while other distortion phenomenon will vary in a more random manner. Once a constant deviation from 45° is detected, the accumulation of values of z(i) may be stopped and the average deviation may be used to determine frequency offset based upon the average phase deviation, i.e., based on the average amount that the z(i) values deviate from 45°.

Preferred embodiments of frequency offset determination include the averaging of several z(i) values to determine an average or constant phase deviation, and correlation of the z(i) values using a bank of unit vectors with angles in the vicinity of 45°, e.g., 45°+d, 45°+2d, 45°+3d, . . . , wherein d is an incremental angle and is set based upon the desired resolution of the system. The unit vector having the best correlation to the calculated value of 45°+$\Delta\omega T$ is selected.

After the phase deviation is determined, the frequency offset calculating circuit 132 outputs a value expressed as $\exp(-j2\pi\Delta\omega T)$, wherein $\Delta\omega$ represents the phase deviation. This value is supplied to a complex multiplier 134 and is multiplied by the output of the analog-to-digital converter 106 to effectively adjust the frequency of the local oscillator and remove the frequency offset.

As will be appreciated by those of ordinary skill in the art, much of the structure and function of the sampling timing adjustment circuit 121 and the frequency offset estimation circuit 122 described above will be performed by a digital signal processor or other type of microprocessor. Since the sampling timing adjustment and frequency offset estimating processes described above perform similar calculations, such as the determination of differential phase angles and correlation between detected and ideal values, shared processing between the apparatus for performing these operations is desirable. Thus, for example, the differential phase circuit 136 of the sampling timing adjustment circuit 121, as illustrated in FIG. 3, may also serve as the circuitry used in the frequency offset estimating circuit 122 for determining the differential phase between successive symbols, including the N-symbol delay circuit 123, the complex conjugation circuit 126 and the complex multiplier 128.

By performing the sampling timing adjustment and frequency offset estimation based upon a calculated deviation from ideal results, the circuitry and processing of the present invention may thus be shared to a great extent. Most preferably, the differential phase values of the set of samples representing the optimum sampling timing as determined by the sampling timing adjustment circuit 121 may be used by the frequency offset estimation circuit 122 to thereby avoid the need for the N-symbol delay circuit 124, the complex conjugation circuit 126 and the complex multiplier 128 in the frequency offset estimation circuit 122. If phase rotation is used in the sampling timing adjustment circuit, the phase rotation circuit 130 would also be included in the sampling timing adjustment circuit and would therefore be unnecessary in the frequency offset estimation circuit 122.

Indeed, as will be recognized by those of ordinary skill in the art, most of the structure of one of the sampling timing adjustment circuit 121 and the frequency offset estimating circuit 122 may be eliminated, For instance, the frequency offset estimating process described above is performed by determining phase rotation in a detected signal. Thus, after an optimum sampling timing is determined by sampling timing adjustment circuit 121, frequency offset compensation can be performed based solely upon the differential phase angle values stored in the RAM 144, or, based on calculations performed by the optimum sampling timing set determining circuit 146. Alternatively, if frequency offset is performed prior to sampling timing adjustment, the same values as calculated by the frequency offset estimating circuit 122 can be used by the sampling timing adjustment circuit 121 to determine an optimum sampling timing.

Once deviations from ideal results are obtained by the sampling timing adjustment circuit 121 based upon the differential phase angle values of the received signal, the frequency offset estimating circuit 122 can estimate and compensate for frequency offset by merely determining a constant deviation from ideal results, as described above. Thus, in a particularly preferred embodiment of the present invention, the frequency offset estimation circuit 121 merely comprises frequency offset calculating circuit 132 which, as described above, determines a phase offset from the differential phase values z(i) and outputs a frequency offset correction value.

In order to improve the sampling timing and frequency offset estimation process against fading and noise, only those received samples r(i) having an energy that is above a certain fixed or dynamically calculated threshold may be selected for use in the above-described process. One such threshold may be the average received signal power or a multiple or fraction thereof over a specified period of time, such as a frame period.

Figure 4:
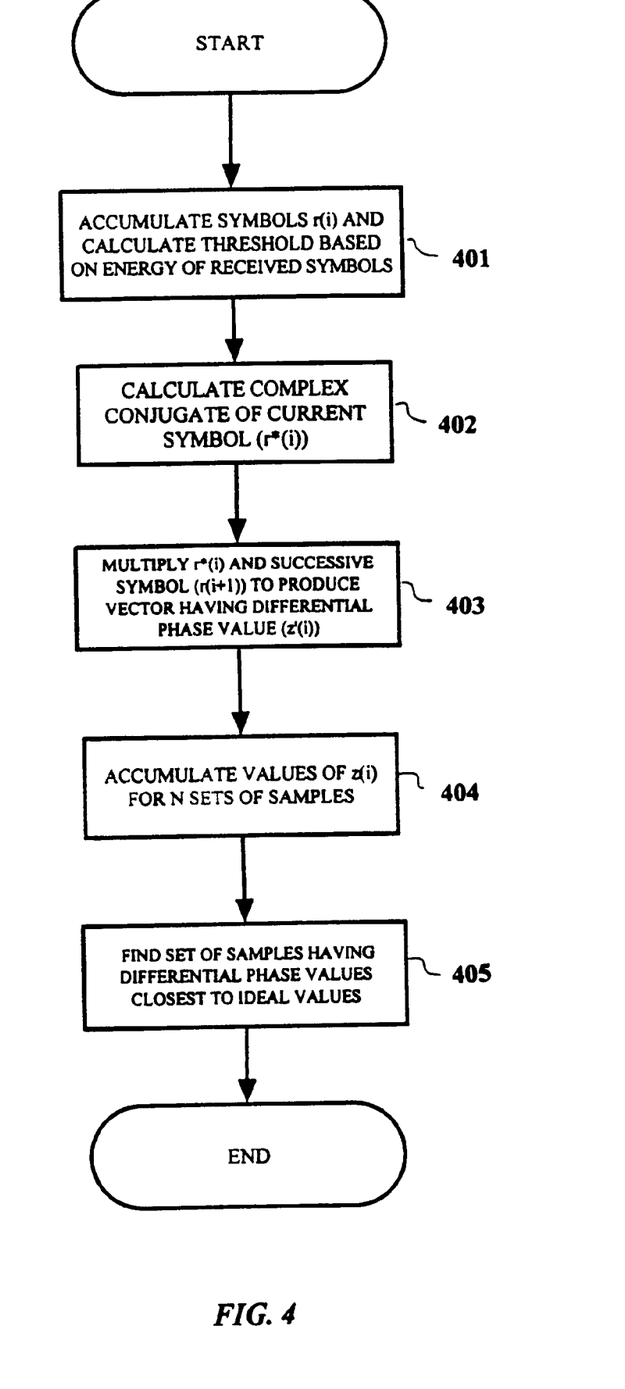
FIG. 4 is a flowchart of a method for sampling timing adjustment in accordance with the present invention.

FIG. 4 is a flowchart illustrating the method of sampling timing adjustment according to the present invention. As illustrated, after a sufficient number samples r(i) have been detected to determine a suitable threshold value proportional to the energy of the samples (step 401), the complex conjugate of a sample r*(i) above the threshold value is determined (step 402) and is multiplied by the value of r(i+1) (step 403), assuming that the value r(i+1) is also above the threshold level. A plurality of the resulting values of z(i) are accumulated (step 404). By correlating the values of vectors z(i) to determine a minimum offset from ideal conditions, an optimum sampling timing is determined (step 405).

In summary, in order to perform sampling timing adjustment and to correct for frequency offset according to the present invention, a plurality of sets of samples of a received symbols is processed as follows. Received pairs of successive symbols above a predetermined threshold value in a communication system are multiplied to produce a vector having an angle representing the differential phase angle therebetween. The resultant values are optionally rotated so that the in-phase and quadrature phase components are positive, A constant deviation from ideal phase angle values is observed, and the sampling timing corresponding to the set of samples exhibiting the smallest deviation from ideal results is selected as the optimum sampling timing.

Sampling timing adjustment and frequency offset estimation and compensation according to the present invention can be performed in many different ways. For instance, a one-time sampling timing adjustment and frequency offset determination can be made for each call set-up and handoff, in which case the sampling timing and frequency offset values obtained remain unchanged most of the time. When a call set-up or handoff occurs, i.e., when a mobile unit has begun communicating with a new base station, the sampling timing adjustment circuit 121 and the frequency offset estimating circuit 122 begin accumulating z(i) values to update their results. Alternatively, sampling timing adjustment and frequency offset compensation can be performed to compensate for crystal oscillator inaccuracies or drift, such calculations being necessary on a periodic basis. In the alternative, of course, one could update these values continually or at time intervals which depend upon the magnitude of the last-detected offset value. Thus, in particularly noisy environments, offset can be compensated for more frequently than in environments in which offset amount is small.

Although the foregoing description provides means for blind sampling timing adjustment and frequency offset estimation, i.e., without prior knowledge of the content of a received information sequence, the invention is not so limited and may be used in connection with predetermined symbol sequences. For instance, a predetermined symbol sequence can be stored in memory, and when the same sequence is detected in an incoming signal, the symbol multiplication values z(i) for the received sequence can be compared to similar values based. For this purpose, a sync word, pilot sequence, training sequence, or the like, may be used as the predetermined sequence.

We claim:
1. A radio receiver comprising:
   receiver means for receiving input signals resulting from transmission of sequences of complex-valued symbols;
   sampling means for oversampling a received input signal at a rate N times the symbol rate thereof so as to produce N sets of samples;
   comparison means for comparing successively received, sampled complex-valued symbols to determine a differential phase angle therebetween;
   sampling timing adjustment means for determining an optimum sampling time as corresponding to the sampling timing of one set of the N sets of samples having differential phase angles closest to ideal value; and
   frequency offset estimating means for determining a constant deviation of the differential phase angles from an ideal phase angle value and estimating a frequency offset based upon the constant deviation.

2. A radio receiver according to claim 1; wherein the comparison means comprises multiplying means for multiplying a complex conjugate of a received complex-valued symbol and a succeeding symbol to output a comparison vector having an angle equal to the phase angle between the received complex-valued symbol and the succeeding symbol.

3. A radio receiver according to claim 2; wherein the comparison means further comprises phase rotating means for rotating the comparison vector so that the angle thereof is between 0° and 90°.

4. A radio receiver according to claim 3; wherein the frequency offset estimating means includes means for determining a constant deviation of the phase angle from an ideal phase angle value by calculating an average phase angle for a plurality of successive comparison vectors.

5. A radio receiver according to claim 1; further comprising frequency offset correction means for correcting for a frequency offset between the receiver means and a carrier frequency of an input signal based upon the estimated frequency offset.

6. A radio receiver according to claim 5; wherein the receiver means comprises an analog receiver having a fixed-frequency local oscillator, and the frequency offset correction means includes means for correcting for a frequency offset between the fixed-frequency local oscillator and a carrier frequency of an input signal based upon the estimated frequency offset.

7. A radio receiver according to claim 1; wherein the input signals are symbols modulated by π/4-shifted DQPSK.

8. A method for receiving a signal comprising the steps of:
   oversampling a received signal resulting from transmission of sequences of complex-valued symbols at a rate N times the symbol rate thereof so as to produce N sets of samples;
   comparing for each set of samples a phase angle of successively received complex-valued symbols to determine a differential phase angle between successive symbols;
   determining which set of the N sets of samples has differential phase angles closest to ideal values to thereby obtain an optimal sampling timing;
   determining the value of a constant deviation of the differential phase angles of the set of N sets of samples having the differential phase angles closest to ideal values from an ideal phase angle value; and estimating a frequency offset based upon the constant deviation.

9. A method for receiving a signal according to claim 8; further comprising the step of correcting for a frequency offset between a receiver and a carrier frequency of an input signal based upon an estimated frequency offset.

10. A method for receiving a signal according to claim 9; wherein the step of correcting for a frequency offset includes the step of correcting for a frequency offset between the local oscillator of a receiver and a carrier frequency of a signal received thereby based upon the estimated frequency offset.

11. A method for receiving a signal according to claim 8; wherein the step of comparing successively received symbols comprises the step of multiplying a complex conjugate of a received complex-valued symbol and a succeeding symbol to produce a comparison vector having an angle equal to the differential phase angle between the received complex-valued symbol and the succeeding symbol.

12. A method for receiving a signal according to claim 11; wherein the step of comparing successively received symbols further comprises the step of rotating the comparison vector so that the angle thereof is between 0° and 90°.

13. A method for receiving a signal according to claim 12; wherein the step of determining which set of the N sets of samples has differential phase angles closest to ideal values to thereby obtain an optimal sampling timing comprises the steps of determining a deviation of the differential phase angles from an ideal phase angle value by correlating the differential phase angles with a set of predetermined phase angles and determining which set of samples has the greatest correlation with ideal phase angles.

* * * * *